United States Patent [19]

Renault et al.

[11] 3,915,630

[45] Oct. 28, 1975

[54] PREPARATION OF ORGANIC SOLVENT-SOLUBLE DYES

[75] Inventors: Claude Renault; Michel Sleghem, both of Antony, France

[73] Assignee: Pechiney-Saint-Gobain, Neuilly-sur-Seine, France

[22] Filed: May 11, 1970

[21] Appl. No.: 36,470

[30] Foreign Application Priority Data

May 12, 1969  France .............................. 69.15239

[52] U.S. Cl. .............................................. 8/41; 8/94
[51] Int. Cl.² ............................................ B06P 1/4
[58] Field of Search ............ 8/173, 175, 94, 88, 89, 8/62, 41

[56] References Cited
UNITED STATES PATENTS

| | | | |
|---|---|---|---|
| 1,841,876 | 1/1932 | Buc | 8/6 X |
| 1,863,332 | 1/1932 | Haelwood | 8/6 X |
| 1,915,965 | 6/1933 | Williams | 8/6 X |
| 2,332,121 | 10/1943 | Trowell | 8/62 X |
| 2,828,180 | 3/1958 | Sertorio | 8/62 |
| 2,972,509 | 2/1961 | Olson | 8/94 |
| 3,129,053 | 4/1964 | Castle | 8/93 |
| 3,211,512 | 10/1965 | Berger | 8/94 X |

FOREIGN PATENTS OR APPLICATIONS

| | | | |
|---|---|---|---|
| 929,053 | 6/1963 | United Kingdom | 8/1 S |
| 687,651 | 3/1967 | Belgium | 8/94 |

OTHER PUBLICATIONS

Lederrer et al., Chromatography, pp. 189–190, pub. by Elsevier Pub. Company, N.Y., 1957.
Peters, J. Soc. Dyers & Col., p. 183, 1958, Vol. 74.
White, pp. 591–597, of the American Dyestuff Reporter, July 31, 1967.

Primary Examiner—Donald Levy

[57] ABSTRACT

This invention is addressed to the preparation of organic dyes which are soluble in an organic solvent and which are prepared by contacting an aqueous solution of a dye which is soluble in water but insoluble in an organic media with a solution of an organic solvent of an anionic emulsifier, and then separating the aqueous phase from the organic phase containing the dye dissolved therein.

21 Claims, No Drawings

PREPARATION OF ORGANIC SOLVENT-SOLUBLE DYES

This invention relates to the preparation of coloring matter or dyes which are soluble in an organic solvent medium, and to the application of dyes which are soluble in organic solvents to various materials and surfaces.

In many problems of coloration, it is helpful and sometimes necessary, to make use of coloring matter or dyes in the form of a solution of the dyes in organic solvents. A few dyes which are soluble in organic solvents are known, but the number is relatively limited. As a result, it is frequently not possible to provide a wide variety of shades and colors based upon the available organic solvent-soluble dyes because of their limited number. In addition, many of the types presently available which are soluble in organic solvents have notably inferior light fastness.

Coloring matter or dyes which are soluble in nonflammable halogenated organic solvents, which have numerous advantages from the standpoint of use and reliability are even fewer in number.

Coloring matter or dyes soluble in aqueous medium are generally used in the dyeing of textile fibers, and are characterized by an extensive variety of characteristics, including the chemical structure, the number of shades available and diversity of behavior from the standpoint of light fastness, water stability and weather proofness. In addition, these dyes are insoluble in organic solvent medium, and consequently cannot be used in coloring techniques requiring the use of dyes contained in an organic solvent.

From the standpoint of chemical structure, dyes are generally believed to contain three important components. The first component is a hydrocarbon skeleton, which is frequently cyclic, such as benzene, naphthalene, and anthracene, all of which are generally colorless. The color of dyes is generally caused by groups on the hydrocarbon skeleton called chromophors, and include the following functional groups: $C = C$, $C = O$ and $N = N$.

The portion of the molecule embodying both of the foregoing components constitutes the chromogen which is frequently colored but is not necessarily water-soluble. Therefore, the compound must contain one or more auxochroms, as represented by $-SO_3Na$, $-COONa$ and $-ONa$, which provide the water-solubility for the chromogen portion of the molecule.

Most of the coloring matter or dyes presently known have groups which may be referred to as auxochroms as described above, which serve to prevent dissolution of the dye molecule in an organic solvent which is not miscible with water, such as aliphatic halogenated hydrocarbons. It is for this reason that few dyes which are soluble in organic solvents such as aliphatic halogenated hydrocarbons, are available to the art.

It has been found that dyes which are soluble in aqueous media but insoluble in organic solvent media can be rendered soluble in organic solvent media.

It is accordingly an object of the present invention to produce and to provide a method for producing dyes which are soluble in organic solvent media from dyes which are soluble in aqueous media but insoluble in organic solvent.

It is a related object of the present invention to produce and to provide a method for producing compositions formulated to include an organic dye dissolved in an organic solvent.

The concepts of the present invention reside in a method for treating coloring matter or dyes which are soluble in aqueous media but insoluble in organic media in which an aqueous solution of the dye is contacted with a solution of an organic solvent in the presence of an anionic emulsifier in an acid medium. The resulting mixture is agitated to insure thorough mixing of the aqueous phase with the organic phase, and then the mixture is allowed to stand for a time sufficient to permit separation of the aqueous phase from the organic phase in which the dye has become dissolved.

In accordance with the present practice of the invention, the aqueous solution of the dye or dyes which is contacted with the organic solution contains between 0.5 to 50 parts by weight of the dye per 100 parts by weight water, and preferably 1-20 parts by weight of the dye per 100 parts by weight water. The relative amounts of the aqueous solution and the organic solvent utilized in accordance with the method of the present invention should be an amount sufficient to provide a mixture containing 2-20% by weight, and preferably 3-10% by weight, of the aqueous solution and 98 to 80% by weight, and preferably 97 to 90% by weight, of the organic solution.

The amount of the emulsifier used is not critical and can be varied within wide ranges. For best results, the emulsifier should be used in an amount within the range of 0.5 to 10 parts by weight of the anionic emulsifier in acid medium per 100 parts by weight of organic solvent, and preferably 1-5 parts emulsifier.

The aqueous phase can be contacted with the organic phase at a temperature within the range of 20°–50°C with agitation time at a minimum of 1 minute, and preferably 5 minutes. Thereafter, the mixture should be allowed to stand for a minimum time of 30 minutes and preferably 60 minutes, in order to permit the aqueous phase to separate from the organic phase.

As the organic solvent, use is preferably made of a nonflammable solvent, such as lower aliphatic halogenated hydrocarbon solvents. Preferred solvents are perchloroethylene, trichloroethylene, methyl chloroform and methylene chloride.

As the anionic emulsifier in acid medium, use can be made of the acid phosphates of nonionic emulsifying agents, including the nonionic emulsifying agents formed by the condensation of dialkyl phenol wherein the alkyl contains 8–18 carbon atoms, with ethylene oxide. Representative of anionic emulsifiers of this type are the dinonylphenyloxyethylene monoacid phosphates. Use can also be made of the acid phosphates of nonionic emulsifying agents formed of the condensation product of an alkanol containing 8–18 carbon atoms and ethylene oxide, as represented by ethylhexanoloxyethylene diacid phosphates and dodecanoloxyethylene monoacid phosphates.

Use can also be made of a mixture of an inorganic acid, such as phosphoric acid or sulfuric acid, with an alkali metal alkylarylsulfonate or an alkali metal dialkylsulfosuccinate. With these emulsifiers, the alkyl group preferably contains 8–18 carbon atoms. In the case of the alkylarylsulfonate, it is generally preferred to make use of those sulfonates in which the aryl group is with phenyl or naphthyl and contains from 1–3 alkyl groups. Representative of emulsifying agents of this type include sodium dodecylbenzene sulfonate, and sodium dioctylsulfosuccinate in admixture with sulfuric acid. The amount of the acid is not critical and may be varied within wide ranges. In general, it is sufficient to utilize between 0.01 and 0.1 parts by weight of the acid per 1 part by weight sulfonate or sulfosuccinate.

Use can also be made of the alkali metal alkyl sulfates wherein the alkyl group contains 8–18 carbon atoms. Representative of this group of compounds are sodium lauryl sulfate, sodium palmityl sulfate and potassium stearyl sulfate.

Water-soluble coloring material or dyes useful in accordance with the practice of the present invention can be selected from a considerable number of dyes known to those skilled in the art. Representative dyes include water-soluble azo-based dyes, water-soluble azo dyes derived from diphenyl methane or triphenyl methane, cyanine dyes derived from quinoline, phthalocyanine dyes, and dyes formed of metalliferous complexes derived from hydroxyanthraquinones.

Representative of the foregoing dyes are the Color Index dyes, such as Acid Yellow 116, Acid Green 23, Basic Blue 50, Basic Red 22 and Blue Basic 3.

It has been observed that during the preparation of compositions in accordance with the method of the present invention, the coloring components of the aqueous phase pass into the organic phase and the aqueous phase, which is practically colorless, rises to the surface and can easily be separated, for example, by decantation.

It will be understood that the present invention relates to compositions formulated of the organic solvent containing the dye dissolved therein as well as the process by which the dye is rendered soluble in the organic solvent. Compositions containing the dyes dissolved in the organic solvent can be used without modification. However, if desired, the solvent can be evaporated to leave a residue of the dye in the form of a paste which can be used with a variety of other organic solvents.

For example, the composition of the present invention can be applied to impart color to the surface of a wide variety of materials including leather, metals, wood and paper. The color of the dye can be imparted to the surfaces treated by the application of the dyes dissolved in the organic solvent, or, if desired, a binder component, such as chlorinated rubber, can be added to the dye dissolved in the organic solvent to serve as a binder and thereby form a varnish. It will be understood by those skilled in the art, that a wide variety of binders may be used in lieu of chlorinated rubber.

Having described the basic concepts of the present invention, reference is now made to the following examples, which are provided by way of illustration, and not by way of limitation, of the practice of the invention.

EXAMPLE 1

A solution of 1 g. of a yellow coloring matter, Color Index Acid Yellow 116, is dissolved in 5 cm$^3$ of water, and the resulting solution is mixed with agitation with a solution containing 1.25 g. of dinonylphenyloxyethylene monoacid phosphate in 43 cm$^3$ of perchloroethylene. Agitation is carried out for 2 minutes, and then the resulting mixture is allowed to stand for 1 hour. It is observed that the water slowly rises to the surface, and the coloring matter is retained in the organic phase in dissolved form. Substantially 100% of the Acid Yellow 116 is found in the organic phase.

EXAMPLE 2

A solution of 1 g. of a green coloring matter, Color Index Acid Green 23, is dissolved in 5 cm$^3$ of water, and the resulting solution is admixed with 2 g of alcohol oxo oxyethylene monoacid phosphates in 43 cm$^3$ of perchloroethylene. Agitation is carried out for 2 minutes, and then the resulting mixture is allowed to stand for 1 hour. Again, the water rises to the surface of the organic phase, and the coloring matter is retained in the organic phase. The yield is again equal to 100%.

EXAMPLE 3

A solution of 1 g. of a blue coloring matter, Color Index Basic Blue 50, is dissolved in 5 cm$^3$ of water, and the resulting solution is admixed with 1 g. of sodium dioctyl sulfosuccinate, 0.1 g. of phosphoric acid at 60° Baume and 43 cm$^3$ of perchloroethylene. Agitation is carried out for 2 minutes, and then the resulting mixture is allowed to stand for 1 hour. Again, the water rises to the surface of the organic phase, and the coloring matter is retained in the organic phase. The yield is again equal to 100%.

EXAMPLE 4

A solution of 1 g of a red coloring matter, Color Index Basic Red 22, is dissolved in 5 cm$^3$ of water, and the resulting solution is admixed with 1 g. of sodium dioctyl sulfosuccinate, 0.05 g. of sulphuric acid and 43 cm$^3$ of perchloroethylene. Agitation is carried out for 2 minutes, and then the resulting mixture is allowed to stand for 1 hour. Again, the water rises to the surface of the organic phase, and the coloring matter is retained in the organic phase. The yield is again equal to 100%.

EXAMPLE 5

A solution of 1 g. of blue coloring matter, Color Index Blue Basic 3, is dissolved in 5 cm$^3$ of water, and the resulting solution is admixed with a solution containing 2 g. of dinonylphenyloxyethylene monoacid phosphate in 43 cm$^3$ of perchloroethylene. Agitation is continued for 2 minutes, and the resulting mixture is allowed to stand for 1 hour. It is observed that the water slowly rises to the surface with the coloring matter being retained in the organic phase.

Thereafter, the water is separated by decantation and 10 g. of chlorinated rubber, which is commercially available under the tradename of Alloprene R 20, is added to the mixture of the dye and perchloroethylene. The resulting product is a varnish which, application to a surface formed of wood, glass, metal or the like is resistant, transparent and has a very lustrous color.

It will be apparent from the forgoing that we have provided a new and improved method for preparing dyes which are soluble in organic solvents from dyes which are soluble in aqueous media but insoluble in organic media. The method and composition of the present invention provides a heretofore unavailable flexibility in the use of dyes, which can be prepared by a simple and efficient method.

It will be understood that various changes and modifications may be made in the details of procedure and use without departing from the spirit of the invention, especially as defined in the following claims.

We claim:

1. Process for the preparation of dyestuffs soluble in an organic medium comprising mixing and aqueous solution of a dye soluble in water but insoluble in organic media with a solution of and anionic emulsifier in an organic solvent in acid medium and separating the aqueous phase from the organic phase containing the dye dissolved therein.

2. A process as defined in claim 1, wherein the aqueous solution contains 0.5 to 50 parts by weight of the dyestuff per 100 parts by weight water.

3. A process as defined in claim 1 wherein the aqueous solution contains 1 to 20 parts by weight of the dyestuff per 100 parts by weight water.

4. A process as defined in claim 1 wherein the organic solvent contains from 0.5 to 10 parts by weight of the emulsifier in acid medium per 100 parts by weight organic solvent.

5. A process as defined in claim 1 wherein the organic solvent contains from 1 to 5 parts by weight of the emulsifier in acid medium per 100 parts by weight organic solvent.

6. A process as defined in claim 1 wherein the aqueous solution is added in an amount corresponding to 2 to 20% by weight of the mixture of the aqueous solution and the organic solution.

7. A process as defined in claim 1 wherein the aqueous solution is added in an amount dorresponding to 3 to 10% by weight of the mixture of the aqueous solution and the organic solvent.

8. A process as defined in claim 1 wherein the organic solvent is a halogenated aliphatic solvent.

9. A process as defined in claim 1 wherein the organic solvent is selected from the group consisting of perchloroethylene, trichloromethylene, methyl chloroform and methylene chloride.

10. A process as defined in claim 1 wherein said dye is selected from the group consisting of water-soluble azo base dyes, water-soluble azo dyes derived from diphenyl methane or triphenyl methane, cyanine dyes derived from quinoline, phthalocyanine dyes and dyes formed of metalliforous complexes derived from hydroxyanthraquinones.

11. A process as defined in claim 1 which includes the step of agitating the mixture for a period of at least one minute.

12. A process as defined in claim 1 which includes the step of agitating the mixture for at least 5 minutes.

13. A process as defined in claim 11 which includes the step of allowing the mixture to stand for a time sufficient to permit the aqueous phase to separate from the organic phase.

14. A process as defined in claim 13 wherein the mixture is allowed to stand for at least 30 minutes.

15. A process as defined in claim 13 wherein the mixture is allowed to stand for at least 60 minutes.

16. A process as defined in claim 1 wherein the emulsifier is selected from the group consisting of acid phosphates of nonionic emulsifying agents, a mixture of an inorganic acid and a material selected from the group consisting of alkali metal alkylarylsulfonates and alkali metal dialkylsulfosuccinate, and an alkali metal alkylsulfate.

17. A process as defined in claim 16 wherein said emulsifier is a mixture of an inorganic acid and said material, said acid being selected from the group consisting of sulfuric acid and phosphoric acid.

18. A process as defined in claim 16 wherein said emulsifier is an acid phosphate of a nonionic emulsifying agent and said nonionic emulsifying agent is selected from the group consisting of the condensation product of a dialkyl phenol and ethylene oxide and the condensation product of an alkanol and ethylene oxide.

19. A process as defined in claim 1 which includes the step of evaporating the organic solvent from the dye contained therein.

20. A process as defined in claim 1 wherein the aqueous solution is mixed with the organic solvent at a temperature within the range of 20°–50°C.

21. A process for the preparation of dystuffs soluble in an organic medium comprising mixing an aqueous solution of a dye soluble in water but insoluble in organic media, said dye being selected from the group consisting of water-soluble azo base dyes, water-soluble azo dyes derived from diphenyl methane or triphenyl methane, cyanine dyes derived from quinoline, phthalocyanine dyes and dyes formed of metalliferous complexes derived from hydroxyanthraquinones, with a solution of an anionic emulsifier in an aliphatic halogenated hydrocarbon solvent in acid medium, and separating the aqueous phase from the organic phase containing the dye dissolved therein.

* * * * *